United States Patent [19]

Brack

[11] 4,080,331

[45] Mar. 21, 1978

[54] TRANSFER PRINTING PROCESS

[75] Inventor: Alfred Brack, Odenthal, Germany

[73] Assignee: Bayer Aktiengesellschaft, Leverkusen, Germany

[21] Appl. No.: 509,029

[22] Filed: Sep. 25, 1974

[30] Foreign Application Priority Data

Oct. 4, 1973 Germany .............................. 2349980

[51] Int. Cl.$^2$ ..................... C07D 209/90; D06P 00/00
[52] U.S. Cl. ................................ 260/326.62; 8/2.5 R; 260/326.5 B; 260/326.5 S; 260/326.27
[58] Field of Search ...................... 260/326.62, 326.27, 260/326.5 B

[56] References Cited

U.S. PATENT DOCUMENTS

| | | | |
|---|---|---|---|
| 3,124,584 | 3/1964 | Weissel | 260/326.11 R |
| 3,399,191 | 8/1968 | Brack | 260/326.62 |
| 3,523,953 | 8/1970 | Strobel et al. | 260/326.13 |
| 3,801,596 | 4/1974 | Baumann | 260/326.62 |
| 3,959,310 | 5/1976 | Brach et al. | 260/326.62 |
| 3,963,747 | 6/1976 | Schefczik et al. | 260/326.62 |
| 3,974,178 | 8/1976 | Ohkawa et al. | 260/326.5 B |
| 4,003,898 | 1/1977 | Gomm | 260/326.62 |

FOREIGN PATENT DOCUMENTS 1,526,430  5/1968  France .............................. 260/326.62

OTHER PUBLICATIONS

Rose et al.; The Condensed Chemical Dictionary, 6th Edition, (1963).
Grant; Hackh's Chemical Dictionary, 3rd Edition, (1944).

Primary Examiner—R. Gallagher
Assistant Examiner—Mary Vaughn
Attorney, Agent, or Firm—Plumley and Tyner

[57] ABSTRACT

The use of dyestuffs of the formula

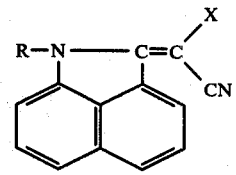

wherein
R represents an alkyl, aralkyl, cycloalkyl or aryl radical, an alkylene radical bonded to the naphthalene ring, or hydrogen, and
X represents an electron-attracting group for dyeing textiles by transfer printing.

5 Claims, No Drawings

TRANSFER PRINTING PROCESS

The subject of the invention is a process for printing synthetic or partly synthetic materials by the transfer printing principle, which is characterised in that the dyestuffs used are compounds of the formula

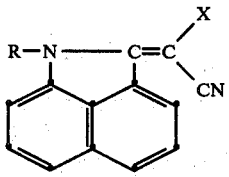   I wherein
R represents an alkyl, aralkyl, cycloalkyl or aryl radical, an alkylene radical bonded to the naphthalene ring, or hydrogen, and
X represents an electron-attracting group,
and wherein
the cyclic and acyclic radicals can contain non-ionic substituents,
as well as printing inks or printing pastes for transfer printing, which contain such dyestuffs, temporary supports for transfer printing, which are printed or impregnated with such dyestuffs, and textiles which have been dyed with such dyestuffs by the transfer printing principle.

Dyestuffs of the formula I which are used preferentially are those in which
R represents a lower alkyl radical which can also be substituted by halogen atoms or lower alkoxy, lower alkoxycarbonyl or nitrile groups and
X represents a nitrile group
and wherein
the naphthalene ring can be substituted by halogen atoms, lower alkyl radicals, lower alkoxy radicals or nitrile groups.

Dyestuffs which are used particular preferentially correspond to the formula

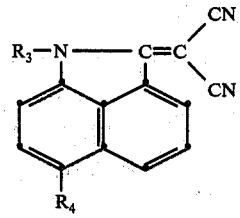   II wherein
$R_3$ represents a methyl, ethyl, β-cyanoethyl, β-chloroethyl, β-methoxy-ethyl, β-ethoxyethyl, n-propyl, isopropyl, n-butyl or iso-butyl group and
$R_4$ represents hydrogen, a methoxy or ethoxy group, the asymmetrical dicyanovinyl group or a chlorine or bromine atom.

The most important are those dyestuffs of the formula II in which
$R_3$ represents methyl, ethyl or β-cyanoethyl and
$R_4$ represents hydrogen, chlorine or bromine.

A further subject of the invention are new dyestuffs of the general formula

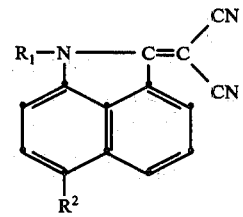   Ia wherein
$R_1$ represents a lower alkyl group with at most 6 C atoms, which can be substituted, for example, by halogen atoms, lower alkoxy groups, lower alkoxycarbonyl groups or nitrile groups and
$R_2$ represents hydrogen, a halogen atom, a lower alkoxy group or the asymmetrical dicyanovinyl group.

Amongst these dyestuffs, those to be singled out as being particularly valuable are the dyestuffs wherein
$R_1$ represents methyl, ethyl or β-cyanoethyl and
$R_2$ represents hydrogen, cholorine or bromine.
These dyestuffs are distinguished by their high affinity to polyester materials, by particularly good solubility in organic solvents and by outstanding fastness to light.

By alkyl radicals there are understood saturated or unsaturated, normal and branched alkyl radicals with at most 6 C atoms which are optionally also substituted by CN, halogen, lower alkoxy or alkoxycarbonyl groups. Preferably, these radicals are monsubstituted.

Aralkyl radicals are alkyl radicals of this type substituted by an aryl radical, especially by the phenyl radical, especially the benzyl and the β-phenylethyl radical.

Possible cycloalkyl radicals are above all cyclohexyl radicals, and possible aryl radicals are the phenyl radical and phenyl radicals substituted by lower alkyl and alkoxy groups or by halogen atoms.

Suitable electron-attracting groups are the nitrile group and other triply hetero-oriented carbon functions, such as carboxylic acid ester groups and carboxylic acid amide groups, and also lower alkylsulphonyl and arylsulphonyl groups and aryl radicals or heteryl radicals. The aryl radicals have the preferred meaning mentioned above.

Suitable heteryl radicals are: benzimidazolyl-2, benzthiazolyl-2, benzoxazolyl-2 and pyridyl-2, -3 or -4.

"Lower" alkyl, alkoxy and alkoxycarbonyl radicals mentioned in any context are to be understood as radicals with 1 - 4 C atoms.

Non-ionic substituents are understood as substituents which are customary in dyestuff chemistry and do not confer solubility in water, such as halogen, OH, lower alkyl, lower alkoxy, CN and others.

Preferred halogen atoms within the scope of the present invention are F, Br and Cl.

The dyestuffs I and I a can be prepared in a manner which is in itself known by condensation of compounds of the formula III with methylene-active compounds of the formula IV

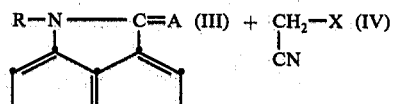

wherein

R represents an alkyl, aralkyl, cycloalkyl or aryl radical, and alkylene radical bonded to the naphthalene ring, or hydrogen and X represents an electron-attracting group and wherein the cyclic and acyclic radicals can contain non-ionic substituents, and A denotes oxygen or sulphur.

Compounds of the formula III in which A denotes oxygen are condensed with the compounds of the formula IV by heating in phosphorus oxychloride to temperatures of between 80° and 110° C, in the presence or absence of an inert diluent, and to assist the condensing action of the phosphorus oxychloride other agents which eliminate water, such as phosphorus pentoxide, phosphorus pentachloride, aluminium chloride, tin-(IV) chloride or zinc chloride can be added.

Suitable inert diluents are, for example, chlorobenzene and dichlorobenzene, toluene, xylene and nitrobenzene.

Compounds of the formula III in which A denotes sulphur can be condensed with the compounds of the formula IV by fusing together or by heating in suitable solvents, such as alcohols, glycols, their ethers, pyridine, quinoline, dimethylformamide or dimethylsulphoxide.

Instead of the compounds of the formula III (A = S) it is also possible to employ, with advantage, their salts or quaternary salts, for example with hydrochloric acid, sulphuric acid, acetic acid, methylsulphuric acid, toluenesulphonic acid esters, dimethyl sulphate or iodomethane.

The procedure has been described, for example, by Dokunichin et al. in Chim. Nauka Prom. 3, 126 (1958), Z. obsc. Chim. 29, 2742 (1959); 30, 1989 (1960), by Ficken and Kendall in Soc. 1960, 1537 and in German Offenlegungsschriften (German Published Specifications) 1,569,692 and 1,569,693.

According to Dokunichin, a thionaphtholactam (III, A=S) is heated with a compound which contains an active methylene group to 150°-160° C, until no further hydrogen sulphide is produced. The isolation of the thionaphtholactam can also be circumvented; for this purpose, the naphthostyryl is heated with phosphorus sulphide in a suitable solvent and the second reactant is then introduced.

The condensation takes place more easily if III (A=S) is first quaternised with methyl iodide; in that case it is possible to carry out the condensation in relatively low-boiling organic solvents, for example in alcohol, toluene or chlorobenzene.

The transfer printing process to be used according to the invention is generally known and has been described, for example, in French Pat. Specification Nos. 1,223,330 and 1,334,829. The dyestuffs are applied, for example in the form of so-called printing inks, such as are described, for example, in French Pat. Specification No. 1,573,698, or as pastes, onto so-called temporary supports (paper, other cellulosic materials such as cotton or cellophane, metal foils and the like, such as are known, for example, from French Pat. Specification No. 1,575,069). These printing inks are dyestuff solutions, containing synthetic resin, in suitable organic solvents, such as benzene, toluene, xylene, chlorobenzene, chloroform, dichloroethane, trichloroethylene, perchloroethylene, ethanol, isopropanol, benzyl alcohol, cyclohexanone, ethyl acetate or their mixtures. However, the printing inks and printing pastes can also be based on aqueous systems and are thus dispersions of the dyestuffs in water, which in addition contains customary dispersing agents and thickeners and optionally fillers (compare French Pat. No. 1,223,330 and French Pat. No. 2,023,496 (=U.S. Pat. No. 3,647,503).

Suitable substrates for transfer printing with dyestuffs of the formula (I) are sheet-like structures such as fleeces, films, tapes, furs, felts and, above all, textile materials, especially those having a high pile, such as velvets and, preferably, carpets, which consist entirely or predominantly of polyesters, such as polyethylene glycol terephthalate, poly-1,4-bis-hydroxymethylcyclohexane terephthalate or cellulose triacetate and cellulose 2½-acetate, or of polyamides or polyacrylonitrile, but also non-textile plastic articles, such as films, tapes or blocks of commercially available polymerisation or polycondensation plastics.

The prints obtained are distinguished by very good fastness properties, especially by very high fastness to light, rubbing and wet treatment, and by particularly high colour saturation.

EXAMPLE 1

20 g of the dyestuff of the formula

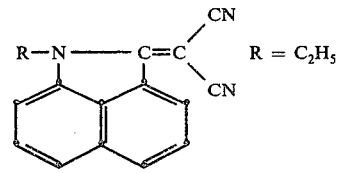

are ground with 0 - 7.5 g of a cyclohexanone-formaldehyde resin, which has a softening point above 160° C, and with 10 - 2.5 g of ethylcellulose $N_4$ in a pearl mill. 100 parts of printing ink are prepared by adding toluene containing 10% of polywaxes. A paper is impregnated with this printing ink. If this paper is pressed against a polyester textile for 15 - 30 seconds at 180° C, a very deeply coloured yellow print of high brilliance and very good fastness properties is obtained.

If instead of this dyestuff the same amount of the dyestuff with R = hydrogen, methyl, β-cyanoethyl, β-methoxyethyl, β-methoxycarbonylethyl, methoxycarbonylmethyl or ethoxycarbonylmethyl, β-chloroethyl, n-propyl, iso-propyl, n-butyl, phenyl, benzyl or ethylene (bonded to the naphthalene ring in the β-position) is used, very fast and brilliant yellow prints are again obtained.

These dyestuffs can be prepared as follows: 1 mol of the corresponding naphtholactam derivative, for example 197 g of N-ethyl-naphtholactam, and 66 g of malodinitrile, are warmed in 600 ml of chlorobenzene. At about 90° C, the dropwise addition of 60 ml of freshly distilled phosphorus oxychloride is commenced, whilst allowing the temperature to rise to about 105° C. After completion of the dropwise addition, the mixture is stirred for 6 hours at 100°-105° C and is allowed to cool, the dyestuff which has separated out is filtered off, and the phosphorus chloride which still adheres is washed out with cyclohexane. The crude dyestuff can, if desired, be recrystallised from acetonitrile or dimethylformamide (optionally with the addition of alcohol). The dyestuff with R = H can be prepared in accordance with the procedure described in DOS (German Published Specification) No. 1,569,692 (page 4).

EXAMPLE 2

75 g of the dyestuff of the formula

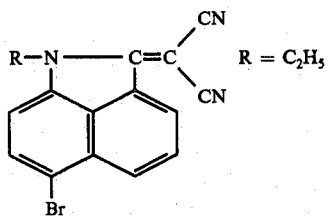

and 50 g of a condensation product of naphthalenesulphonic acid and formaldehyde are finely ground in the presence of 100 g of water in a ball mill. A printing paste is prepared by thickening with 400 g of a 10% strength carob bean flour ether thickener and 400 g of water. Paper is printed with this paste by the gravure printing process. If this paper is pressed against a textile of polyester, polyamide or cellulose triacetate fibres for 15 – 60 hours at 200°, a deeply coloured, very fast strongly reddish-tinged yellow print is obtained.

If instead of this dyestuff the same amount of the

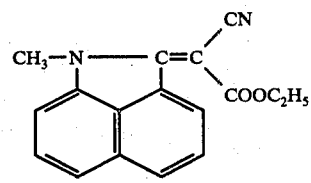

are dispersed in accordance with the instructions in Example 2.

100 g of this dispersion are mixed with 800 g of water and 100 g of a 5% strength alginate thickener. A cotton fabric is impregnated with this mixture. The dried fabric is used as the temporary support for transfer printing onto polyamide, polyacrylonitrile, polyester or cellulose triacetate fibres.

A very deeply coloured and fast yellow dyeing of high brilliance is obtained.

The dyestuff can be prepared in accordance with the instructions of Dokunichin et al., in Z. obsc. Chim. 29, 2742 (1959).

Instead of this dyestuff, it is also possible to use the same amount of the following dyestuffs:

| R | X | Preparation |
| --- | --- | --- |
| β-Cyanoethyl | Ethoxycarbonyl | Vulfson and Sumilina, Izv. Akad. SSSR, 1968, 2365 |
| Hydrogen | Benzoyl | Dokunichin and Gajewa, Chim. Nauka Prom., 3, 126 (1958) |
| Ethyl | Phenyl | analogously to Dokunichin and Gajewa, Chim. Nauka Prom., 3, 126 (1958) |
| Ethyl | Pyridyl-(2) | analogously to Dokunchin and Gajewa, Chim. Nauka Prom., 3, 126 (1958) |
| Ethyl | pyridyl-(4) | analogously to Dokunichin and Gajewa, Chim. Nauka Prom., 3, 126 (1958) |
| Ethyl | Benzimidazolyl-(2) | OS (German Published Specification) 1,931,780 | dyestuff with R = hydrogen, methyl, β-cyanoethyl, β-methoxyethyl, β-ethoxyethyl, n- and iso-propyl or n- and iso-butyl or the corresponding 4-chloro-, 4-methyl-, 4-ethyl- or 4-methoxy-derivatives are used, similar prints are obtained.

The dyestuffs can be prepared as follows: 1 mol of the particular naphtholactam derivative, for example 276 g of N-ethyl-4-bromonaphtholactam — and 70 g of malodinitrile are stirred with 750 g to 1,000 g of phosphorus oxychloride, with the addition of 150 g of phosphorus pentoxide, for 10 hours whilst boiling under reflux. After cooling, the mixture is decomposed by pouring into ice water, during which the temperature should not rise above about 30° C. After completion of hydrolysis of the phosphorus oxychloride, the dyestuff which has separated out is filtered off and washed with water until neutral.

It can be purified by recrystallisation from dimethylformamide, if necessary with addition of alcohol.

EXAMPLE 3

75 g of the dyestuff of the formula

EXAMPLE 4

20 g of the dyestuff of the formula

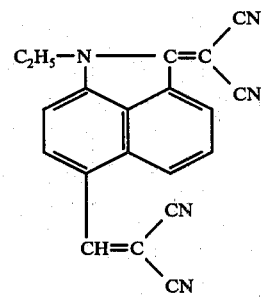

are used in accordance with the instructions of Example 1. A very fast and clear golden yellow print of good colour saturation is obtained.

The dyestuff is obtainable as follows: a mixture of 197 g of N-ethyl-naphtholactam and 82 g of dimethylformamide is warmed to about 70° C. 170 g of freshly distilled phosphorus oxychloride is allowed to run in slowly at not more than 80° C. The mixture is then kept for 1 hour at 80° C, 2 hours at 90°–95° C and 2 hours at 105°–110° C.

After cooling, the mixture is first diluted with 2 l of water and then adjusted to a total volume of 10 l with water. After stirring for several hours at room temperature, the crystalline precipitate is filtered off and washed with water.

173 g of the aldehyde of the formula

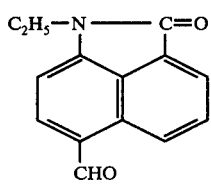

are obtained. A sample recrystallised from alcohol melted at 129° C.

112 g of crude product are heated with 70 g of malodinitrile in 600 g of phosphorus oxychloride for 8 hours to about 100° C. Hydrolysis of the phosphorus oxychloride with ice water and customary isolation gives the dyestuff, which can be purified by recrystallisation from dimethylformamide.

The analogous dicyanovinyl dyestuffs from N-methyl-, N-β-cyanoethyl-, N-β-methoxyethyl-, N-n-propyl-, N-iso-propyl- and N-n-butyl-naphtholactam can be prepared, and used, in the same manner.

EXAMPLE 5

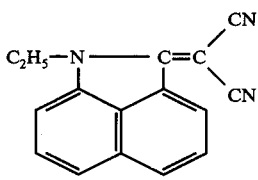

and 50 g of a condensation product of naphthalenesulphonic acid and formaldehyde and 100 g of water are finely dispersed in a ball mill. The dyestuff dispersion thus obtained is stirred into a thickener which consists of 21 parts of water, 7 parts of diacetone-alcohol, 41.3 parts of Microdol extra (natural calcium magnesium carbonate), 0.2 part of sodium hexametaphosphate, 0.5 part of naphthalenesulphonic acid/formaldehyde condensation product, 8 parts of bentone EW 3% strength (swelling clay) and 12 parts of acrylate binder DA (a 50% strength solution of the ammonium salt of a polyacrylate in 33% strength aqueous ethyl alcohol. The polyacrylate is a copolymer of 60 acrylic acid ethyl ester, 25 methacrylic acid ethyl ester and 15 acrylic acid).

This printing paste is printed by means of silk-screen printing screens or cylindrical screens onto a temporary support, preferably paper with a weight per square metre of approx. 60–80 g per square metre and a Cobb$_{60}$ value of about 80. A smooth print is obtained. Textiles of polyester, polyamide, polyacrylonitrile and cellulose triacetate can be printed with the paper thus produced by bringing the textile into contact with the paper for 15–60 seconds and heating to tempeatures of 190°–200° C. Brilliant, yellow prints of good fastness to light and to wet processing are obtained on the said fibres.

EXAMPLE 6

A print is produced on paper, fleece material or cotton nettle by means of a printing paste as described in Example No. 5. When this print is pressed against carpet material (needle-punched felt or tufted material) of polyamide 6 or 66 for 30 seconds at 200° C, a brilliant yellow print is obtained, which is distinguished not only by good fastness properties but also by the fact that the dyestuff has penetrated substantially more deeply into the textile material than is known in other cases of transfer printing. This is a surprising effect which leads to a substantial improvement in the quality of the print.

EXAMPLE 7

A print is produced on paper with a printing paste as described in Example No. 5, and a bulky textile, for example carpet material, is pressed against this paper in a chamber. When this chamber is evacuated down to a pressure corresponding to approx. 25 mm Hg column, a deep yellow print can be achieved at temperatures as low as between 160° and 190° C. At the same time the dyestuff penetrates particularly deeply into the bulky material.

EXAMPLE 8

A printed paper as described in Example 5 is used and is pressed against blankets produced from polyacrylonitrile material. This process is carried out in a chamber under reduced pressure between 70 and 200 mm Hg column. A print in which the yellow dyestuff has penetrated deeply into the bulky material is obtained.

EXAMPLE 9

When printing texturised materials, the texturising effect is impaired by pressing at high temperatures. If now a paper is used which has been produced as described in Example 5, strong yellow prints can be obtained at temperatures as low as between 160° and 180° C, under which conditions the bulky structure of the texturised textile is largely preserved.

EXAMPLE 10

A paper is used which was prepared by impregnating it with a 3% strength solution of the dyestuff used in Example 5, in toluene. When this evenly dyed paper is pressed against a textile of synthetic fibres, preferably polyester, the textile is dyed yellow on one side. Further effects can be produced if thereafter the rear of the textile is coloured with a paper printed or dyed in a different colour from the first.

EXAMPLE 11

A paper printed in accordance with Example 5 is pressed against acrylic material for 30 seconds at 200° C. A yellow print is obtained. If the paper from which a print has already been produced is used a second time, a print of similar depth is obtained under the same conditions. Depending on the dyestuff uptake of the textile used, a paper can be re-used up to 4 times.

EXAMPLE 12

The experiments presented in the preceding examples are not only carried out on polyester, triacetate, acetate, polyamide and polyacrylonitrile materials, but also on woven fabrics and knitted fabrics which consist of mixed fibres or mixtures of the abovementioned fibres with one another or with natural fibres and regenerated fibres.

EXAMPLE 13

Papers which have been prepared according to Example 5 are used and films of polyester, polyamide or polyacrylonitrile, or plastic-coated woven fabrics or fleeces, are printed therewith. Brilliant, yellow prints with good fastness properties are obtained.

EXAMPLE 14

Papers which have been prepared according to Example 5 are used and articles which have been produced from foams are printed therewith. The foams can be produced from polyester, polyether or polystyrene. Once again, a strong yellow print is obtained.

EXAMPLE 15

Papers which have been prepared according to Example 5 are used and articles which have been flocked in accordance with one of the customary methods are printed therewith. Suitable flock materials are fibres of polyester, triacetate, polyamide and polyacrylonitrile. Fast yellow prints are obtained.

EXAMPLE 16

A printing paste is prepared in accordance with the instructions of Example 5, using 50 g of a non-ionic emulsifier of the type of an ethoxylated nonylphenol or of a similar ethylbenzene instead of the condensation product of naphthalenesulphonic acid and formaldehyde. If this printing paste is used in Examples 6 – 15, equivalent prints are obtained.

I claim:
1. Dyestuff of the formula

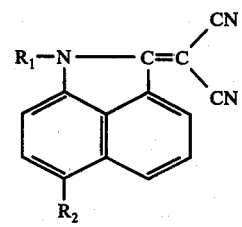

wherein
  $R_1$ is saturated $C_1$–$C_6$-alkyl; or saturated $C_1$–$C_6$-alkyl mono-substituted by halogen, $C_1$–$C_4$-alkoxy, ($C_1$–$C_4$-alkoxy)-carbonyl or CN; and
  $R_2$ is hydrogen; halogen; $C_1$–$C_4$-alkoxy or asymmetrical dicyanovinyl.
2. Dyestuff of claim 1 wherein
  $R_1$ is a methyl, ethyl, β-cyanoethyl, β-chloroethyl, β-methoxyethyl, β-ethoxyethyl, n-propyl, isopropyl, n-butyl or iso-butyl; and
  $R_2$ is hydrogen, methoxy, ethoxy, asymmetrical dicyanovinyl, chlorine or bromine.
3. Dyestuff of claim 1 wherein
  $R_1$ is methyl, ethyl and β-cyanoethyl; and
  $R_2$ is hydrogen, chlorine or bromine.
4. Dyestuff of claim 1 wherein
  $R_1$ is ethyl; and
  $R_2$ is H.
5. Dyestuff of claim 1 wherein
  $R_1$ is ethyl and
  $R_2$ is bromine.

* * * * *